SILK SCREEN APPARATUS FOR PRECISION COATING ARTICLES

Filed April 14, 1967 3 Sheets-Sheet 1

INVENTORS
Gary Hillman
Joseph Luke Douches

Jack Schuman
ATTORNEY

SILK SCREEN APPARATUS FOR PRECISION COATING ARTICLES

Filed April 14, 1967 3 Sheets-Sheet 2

INVENTORS
Gary Hillman
Joseph Luke Douches

Jack Schiman
ATTORNEY

SILK SCREEN APPARATUS FOR PRECISION COATING ARTICLES

Filed April 14, 1967

INVENTORS
Gary Hillman
Joseph Luke Douches
Jack Schuman
ATTORNEY

United States Patent Office 3,486,441
Patented Dec. 30, 1969

3,486,441

SILK SCREEN APPARATUS FOR PRECISION COATING ARTICLES

Gary Hillman, Livingston, and Joseph Luke Douches, Flagtown, N.J., assignors to Mitronics Inc., Murray Hill, N.J.

Filed Apr. 14, 1967, Ser. No. 631,075
Int. Cl. B05c *1/02;* B41f *17/14*
U.S. Cl. 101—35 3 Claims

ABSTRACT OF THE DISCLOSURE

A silk screen is mounted to a vertically movable table. An article is supported below the screen in a fixture on a universal compound table which can be rotated and translated in a horizontal plane to precisely orient and position the article under the screen. The table is lowered to engage the screen with the article, and a squeegee forces slurry through the screen on to the article. A vacuum applied through apertures in the fixture holds the article as the movable table is lifted after screening.

Background of the invention

This invention relates broadly to apparatus for precision coating articles. More specifically, this invention relates to apparatus employing a silk screen movable toward and away from the article, through which screen a slurry is forced on to the surface of the article being coated, with means to precisely position and orient the article relative to the screen.

U.S. Patent 2,997,948 (1961) to Scheeler et al. shows a very complicated apparatus employing a silk screen movable toward and away from an article to be printed upon, through which screen ink is forced by a squeegee on to the article. However, no means are disclosed to adjust the orientation and position of the article relative to the screen. Consequently, it will be quite difficult to properly and precisely register the opening in the screen with the article to be printed upon. Moreover, this patent is directed to the inking of printed circuit boards, and is not capable of precision coating a series of miniature electronic components as in the present invention.

Summary of the invention

One of the objects of this invention is to provide apparatus for precision coating an article.

Another of the objects of this invention is to provide apparatus for precision coating, with virtually perfect reproducibility, a series of articles.

Yet another object of this invention is to provide apparatus for precision coating an article which apparatus is relatively inexpensive and uncomplicated, durable and requiring a minimum of maintenance.

Other and further objects of this invention will become apparent during the course of the following description and by reference to the accompanying drawing and appended claims.

We have discovered that the foregoing objects can be attained in the preferred embodiment by providing a vertically movable silk screen having the configuration of the desired coating formed therein, with means to support the article below the screen, said means being capable of precisely and accurately adjusting the orientation and position of the article relative to the opening in the silk screen.

Figure 1:
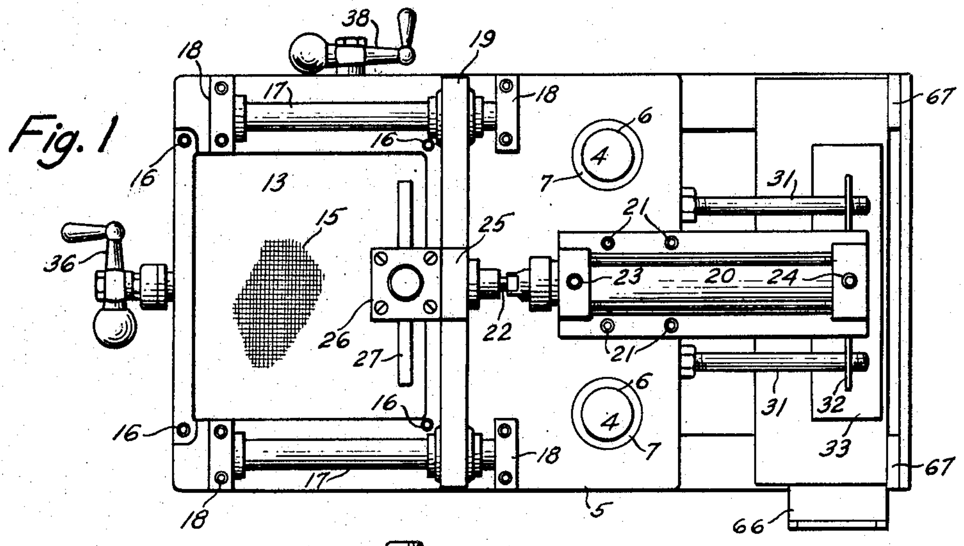
FIGURE 1 represents a view in plan of the apparatus.

Fixed table 1 is mounted a convenient distance above floor 2 on legs 3. Spaced parallel guide columns 4 are rigidly secured to fixed table 1 and extend upwardly therefrom.

Apertures 6 in guide collars 7, the latter extending through and being secured to movable table 5, register with, and snugly fit the guide columns 4. In this manner, movable table 5 can be reciprocated vertically relative to fixed table 1 with virtually no play (i.e., with virtually no translation or rotation in a horizontal plane). This feature is important to attaining an accurate and precise registration of the printing to be applied to the articles of production, as well as reproducibility of this accurate and precise registration on the entire series of the articles of production.

The actual reciprocation of movable table 5 is effected by means of a fluid (hydraulic or pneumatic) cylinder 8 mounted to the underside of the fixed table 1, between legs 3, the piston rod 9 thereof extending through an aperture (not shown) in the fixed table 1, upwardly between guide columns 4, to the movable table 5 to which it is suitably secured. Fluid lines 10 and 11, communicating with a conventional source of fluid pressure and appropriate valves (not shown), connect to opposite ends of the fluid cylinder 8 above and below, respectively, the piston 12 therein.

Figure 2:
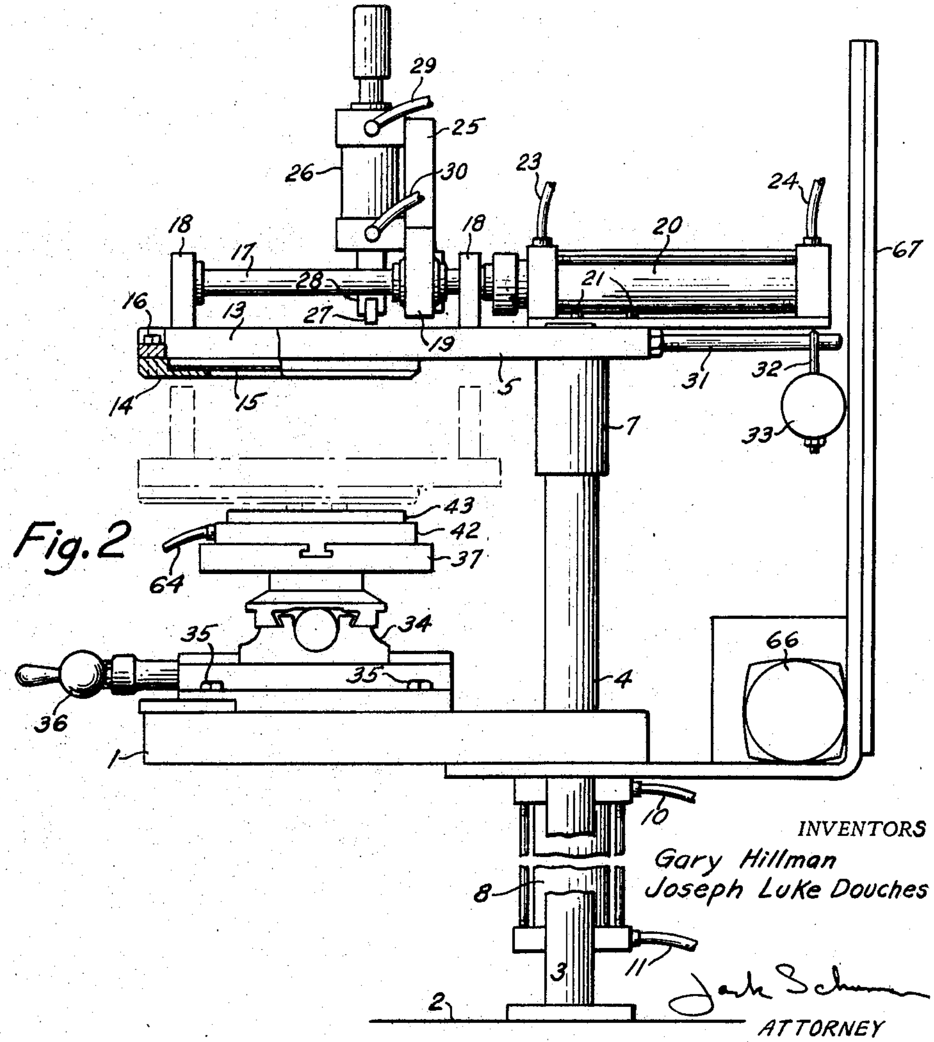
FIGURE 2 represents a view in side elevation of the apparatus, showing in phantom the front portion of the movable table lowered to contact the article being printed upon.
Figures 3, 4:
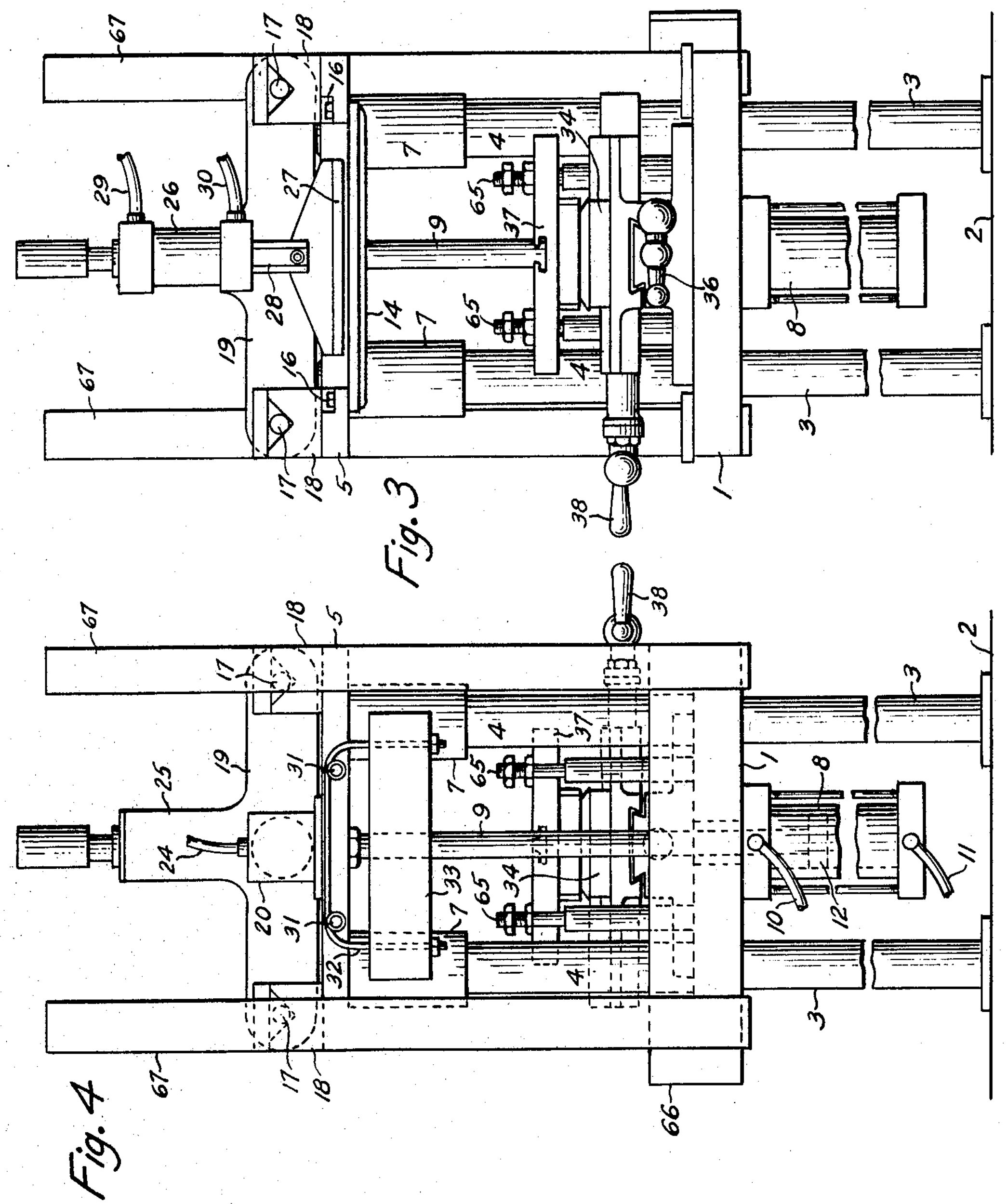
FIGURE 3 represents a view in front elevation (i.e., from the left of FIGURE 2) of the apparatus, with the work-holding fixture removed for purposes of clarity.
FIGURE 4 represents a view in rear elevation (i.e., from the right of FIGURE 2) of the apparatus, with the work-holding fixture removed for purposes of clarity.

It will be apparent, then, that if it is desired to lower movable table 5 from the position shown in full lines in FIGURE 2, fluid line 10 is pressurized and fluid line 11 is connected to sump or otherwise, thereby to pressurize fluid cylinder 8 above piston 12, the latter being forced down along with piston rod 9, thereby effecting the descent of movable table 5. It will also be apparent that, if it is desired to elevate movable table 5 from the position shown in phantom in FIGURE 2, fluid line 11 is pressurized and fluid line 10 is connected to sump or otherwise, thereby to pressurize fluid cylinder 8 below piston 12.

Movable table 5 is provided with rectangular opening 13. Screen support frame 14, carrying silk screen 15, is rigidly mounted, by means of screw 16, to the underside of movable table 5 in registry with opening 13.

Guide elements 17 are mounted, in parallel relation to each other, along opposite sides of opening 13 to movable table 5 by means of brackets 18 at each end of each said guide element 17.

Guide elements 17 slidably extend through apertures in traveling member 19, whereby said traveling member 19 can be reciprocated horizontally across opening 13.

The actual reciprocation of traveling member 19 is effected by means of a fluid (hydraulic or pneumatic) cylinder 20 mounted, by means of screws 21, to movable table 5, the piston rod 22 thereof being secured in suitable fashion to the traveling member 19. Fluid lines 23 and 24, communicating with a conventional source of fluid pressure and appropriate valves (not shown) connect to opposite ends of the fluid cylinder 20 to the left and right, respectively, of the piston therein (not shown).

It will be apparent, then, that if it is desired to move traveling member 19 from the position shown in FIGURE 2 to the left, fluid line 24 is pressurized and fluid line 23 is connected to sump or otherwise, thereby to pressurize fluid cylinder 20 to the right of the piston therein, the latter being forced to the left along with piston rod 22, thereby effecting a leftward movement of the traveling member 19. It will also be apparent that, if it is desired to reverse the direction of movement of traveling member 19 fluid line 23 is pressurized and fluid line 24 is connected to sump or otherwise, thereby to pressurize fluid cylinder 19 to the left of the piston therein.

Traveling member 19 is provided with an upwardly extending arm 25 at its mid-portion, and fluid cylinder 26 is mounted to the said traveling member 19 and arm 25 as shown. Squeegee 27 is secured to the bottom end of the piston rod 28 of the said fluid cylinder 26, and is adapted to extend through the opening 13 to engagement with silk screen 15. Fluid lines 29 and 30, communicating with a conventional source of fluid pressure and appropriate valves (not shown) connect to opposite ends of the fluid cylinder 26 above and below, respectively, the piston therein (not shown).

It will be apparent, then, that if its is desired to lower squeegee 27 from the position shown in FIGURE 2 to engagement with silk screen 15, fluid line 29 is pressurized and fluid line 30 is connected to sump or otherwise, thereby to pressurize fluid cylinder 26 above the piston therein, the latter being forced downwardly along with piston rod 28 and squeegee 27. It will also be apparent that, if it is desired to raise squeegee 27 from engagement with the silk screen 15, fluid line 30 is pressurized and fluid line 29 is connected to sump or otherwise, thereby to pressurize fluid cylinder 26 below the piston therein.

In order to mitigate unbalanced loading about guide columns 4, adjustable means to regulate the center of gravity of movable table 5 is provided. Thus, rods 31 are secured to movable table 5 and extend rearwardly thereof. U-bolt 32 is secured to counterweight 33 and may be positioned on the said rods 31 for adjustment longitudinally thereof.

Universal compound table 34 is secured to fixed table 1 by means of bolts 35. Crank 36 reciprocates platen 37 of the universal compound table 34 backwards and forwards (i.e., to the right and left of FIGURE 1), and crank 38 reciprocates platen 37 of the universal compound table 34 sideways (i.e., in a direction perpendicular to the movement effected by crank 36). Also, universal compound table 34 can be rotated about a vertical axis. It will be apparent, then, that any point on the platen 37 can be precisely adjusted in any direction in a horizontal plane, and that any two points on the platen 37 can be oriented precisely.

Fixture 39, adapted to support the article 40 being printed upon, is secured to platen 37 by means of bolts 41. Fixture 39 comprises sub-plate 42, base plate 43, and top plate 44.

Base plate 43 is formed with a U-shaped (as viewed in plan in FIGURES 5 and 6) recess 45 separating a central raised area 46 from end raised areas 47. The outline of the article 40 is indicated in phantom in FIGURES 5 and 6, and within this outline a plurality of small apertures 48 ($\frac{1}{32}''$ in diameter in the preferred embodiment) extend entirely through the base plate 43 from the top of the central raised area 46 to the bottom of the base plate 43. The purpose of these apertures 48 will be described hereinafter.

Top plate 44 is secured to base plate 43 by means of screws 49. A plurality of small apertures 50, of the same diameter as and in registry with apertures 48, extend entirely through top plate 44. Elongated openings 51 are provided in top plate 44 in overlying relation to the two arms of recess 45. Guide pins 52, preferably of a hard material such as tungsten carbide, are secured to top plate 44 on opposite sides of each elongated opening 51 as shown. Guide pins 53, also of a hard material such as tungsten carbide, are secured to top plate 44 adjacent apertures 50.

Figures 5, 6, 7:
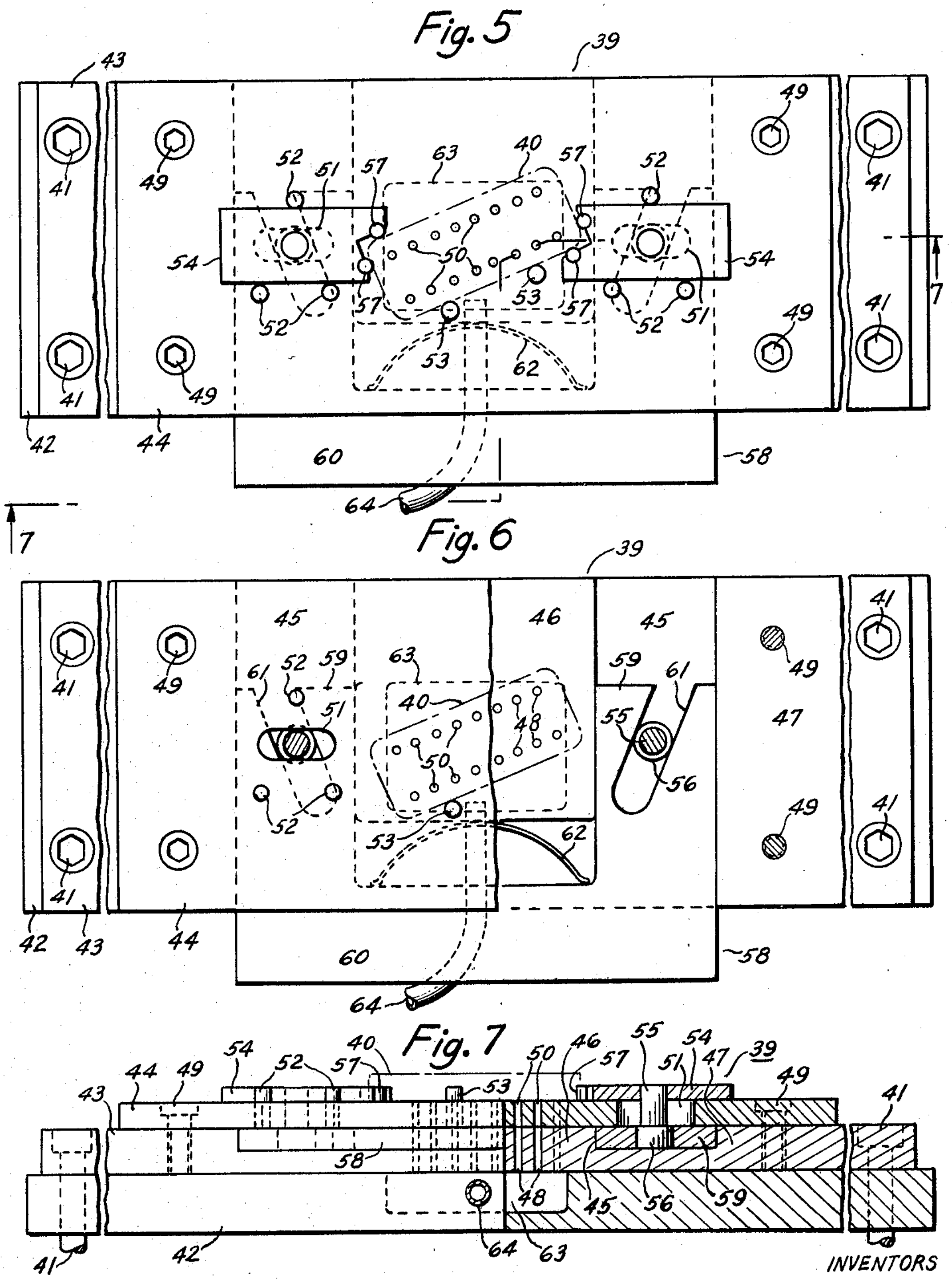
FIGURE 5 represents a view in plan of a typical work-holding fixture, showing in phantom the article being printed upon.
FIGURE 6 represents a view in plan similar to FIGURE 5, with certain portions removed or broken away to show details.
FIGURE 7 represents a vertical section taken along the line 7—7 of FIGURE 5.

Locating elements 54 are slidably mounted on top plate 44 by means of bolts 55 having enlarged heads 56 below elongated openings 51 and of diameter too large to pass through the said elongated openings 51, the tops of bolts 55 extending thruogh the elongated openings 51 and being secured to the said locating elements 54. It will be noted that guide pins 52 are so spaced on opposite sides of elongated openings 51 as to slidably engage the sides of the locating elements 54. In this manner, it will be apparent that locating elements 54 are free to be moved only towards or away from each other (i.e., towards or away from the central portion of top plate 44 having apertures 50), the said locating elements 54 having virtually no play for movement in any other direction. In the fixture 39 as shown herein, the article 40 is intended to be held in a cocked position (i.e., in a horizontal plane with its longitudinal axis at an angle to the longitudinal axis of the fixture 39), with diagonal corners of the article to be gripped by the locating elements 54. Accordingly, the inner edges of the locating elements 54 are notched to clear the diagonal corners of the article 40 and hardened pins 57, preferably of tungsten carbide, are secured to the said locating elements 54 so as to project beyond the notched inner ends thereof as shown. In this manner, when locating elements 54 are moved toward article 40 to grip the same, contact will be made only by the pins 57, as shown in FIGURE 5.

The means for effecting the inward or outward movement of the locating elements 54 will now be described. A cam plate 58, having legs 59 and handle 60, is of thickness sufficient to slidably fit in recess 45 between top plate 44 and base plate 43. Each leg 59 is provided with a cam slot 61 adapted to engage opposite sides of a bolt head 56. The two cam slots are inclined equally with respect to the transverse axis of the fixture 39 (i.e., with respect to the perpendicular bisector of the line joining the centers of bolt heads 56) and converge towards handle 60. It will be apparent from an inspection of FIGURES 5 and 6 that, when handle 60 is urged toward fixture 39, locating elements 54 will approach the central portion of the fixture simutlaneously and at the same rate. Conversely, when handle 60 is withdrawn, locating elements 54 will simultaneously separate and proceed toward opposite ends of the fixture 39. Spring 62 is provided in recess 45 between the central raised area 46 and handle 60 so as to normally urge handle 60 away from fixture 39.

Sub-plate 42 is provided with a chamber 63 open at the top and of dimension sufficient to communicate with all of the apertures 48 in base plate 43. A vacuum line 64 is connected to sub-plate 42 and communicates between chamber 63 therein and a conventional source of vacuum and valve arrangement (not shown). It will be apparent that, when a vacuum is applied to chamber 63, this vacuum is also applied through apertures 48 and through registering apertures 50, for a purpose to be described hereinafter.

Mounted to fixed table 1, between guide columns 4 and piston rod 9, are vertically adjustable stops 65 adapted to engage the underside of movable table 5 and to limit downward movement thereof. Stops 65 are adjusted to prevent rupture of silk screen 15 in the event the movable table 5 is lowered beyond the point required for contact between silk screen 15 and article 40.

A short description of the nature of article 40 will now precede the description of the operation of the preferred embodiment. Metallized ceramics constitute components of many types of miniature electronic assemblies, such as headers for semiconductor packages and the like. As the name implies, these comprise a metallic coating of a desired configuration bonded to a ceramic base or substrate. Specifically, a coating of molybdenum or tungsten may be bonded to a heat conducting, electrically insulating beryllia or alumina substrate. One of the steps in a typical process of making metallized ceramics involves the application of the metallic coating in the form of a slurry (the metallic powder being dispersed, for instance, in amyl acetate and methyl cellulose) to the ceramic substrate, with a subsequent firing to bond the coating to the ceramic substrate. It will be apparent that, in metallizing ceramics for miniature electronic components, the coating must be applied with a very high degree of precision, both as to the dimensions of the coating and as to the orientation of the coating on the substrate; otherwise the electrical and thermal characteristics of the miniature component might be adversely affected. As hereinbefore mentioned, it is a particular object of this invention to provide apparatus for applying such coatings with a high degree of precision to an article, such as the ceramic substrate, as well as with a high degree of reproducibility of such precision on a sequence of such articles in production.

The operation of the preferred embodiment will now be described. Let it be assumed that the outline of the configuration of the coating to be applied has been accurately formed in silk screen 15, by conventional methods, that silk screen 15 is properly mounted in screen support frame 14, and that screen support frame 14 is fastened to movable table 5 in the manner heretofore described. Let it also be assumed that a coating of this configuration is to be applied to a number of articles 40 of the same dimension.

The first article 40 is placed on top plate 44, with one edge thereof bearing on guide pins 53, handle 60 of cam plate 58 then being forced inwardly by the operator of this apparatus to cause locating element 54 to move inwardly and grasp the diagonal corners of the article 40.

The article 40 is then properly and precisely oriented under the configuration of desired coating formed in the silk screen 15. Such orientation and positioning is attained by adjusting the universal compound table 34 about its vertical axis of rotation so as to properly and precisely angularly orient the article 40 relative to the configuration of desired coating formed in the silk screen 15, and by manipulating cranks 36 and 38 for translatory adjustment and positoining of the article 40 under the configuration of desired coating formed in the silk screen 15.

Fluid cylinder 8 is then operated to lower movable table 5 until silk screen 15 engages article 40, and the stops 65 are adjusted to prevent movable table 5 from inadvertently being lowered below this level.

Movable table 5 is then raised and production operations can begin. A quantity of the slurry of metallic powder is introduced to the top of the silk screen 15. Movable table 5 is lowered to engagement with stops 65, silk screen 15 then being in proper engagement with the surface of article 40. The operator of the apparatus then operates fluid cylinder 26 to lower the squeegee 27 to engagement with the silk screen 15 and, after this, operates fluid cylinder 20 to cause traveling member 19, and therefore squeegee 27, to traverse silk screen 15, thereby forcing some of the slurry through the open portion of the silk screen 15, corresponding with the configuration of the desired coating, and on to the surface of article 40.

During at least part of this time, a vacuum has been applied to chamber 63, through vacuum line 64, and this vacuum extends through apertures 48 and 50 to the underside of the article 40. At the conclusion of the screening operation described in the preceding paragraph, the movable table 5 is raised and the vacuum holds article 40 in place on top plate 44. Were it not for the vacuum, the relatively light article 40 would be picked up with the silk screen 15 and the precise characteristic of the coating thereon would be ruined. After the movable table 5 has been raised, the operator of the apparatus removes the vacuum from chamber 63 and releases handle 60 of cam plate 58, thus moving locating elements 54 away from the article 40, and the latter can now be removed from top plate 44, with the aid of tweezers if desired. The now-coated article 40 may then be subjected to further operations to bond the coating thereto.

Another article 40 is placed in position on top plate 44, as heretofore described, and will automatically be in proper position for the precision application of the coating. The screening operations hereinabove mentioned are repeated.

It will be recognized that article 40 may have an outline different from that herein illustrated. It will be understood that appropriate dimensional modifications may therefore be made to fixture 39.

It will also be recognized that a plurality of articles 40 may be coated simultaneously in one screening operation. In this event, a plurality of configurations of the desired coating will be formed in silk screen 15. Fixture 39 will also be modified to hold this plurality of articles 40, preferably with each individual, discrete article 40 properly oriented and positioned with respect to the other individual discrete articles 40; thereafter, the plurality of articles 40 initially will be oriented and positioned properly, en masse, with respect to the configurations in the silk screen 15, by adjusting and manipulating the universal compound vise 34.

It may be desired to automatically take the apparatus through a series of steps comprising raising and lowering movable table 5, operating fluid cylinders 20 and 26 and making and breaking vacuum in chamber 63. In the preferred embodiment, this has been done by incorporating automatic timer mechanism 66 to control in sequence the values associated with the fluid pressure systems related to fluid cylinders 8, 20, and 26 and the valves associated with the vacuum system. Such automatic timer mechanism 66 may be any one of a number of types commercially available, such as Model RC–J4208 Timer manufactured by Industrial Timer Corp. of Parsippany, N.J., and the hookup of such automatic timer device 66 to control in sequence a number of valves is so well known an within the purview of one skilled in the control art that there is no need to illustrate the details thereof herein.

As a safety measure, guards 67 are secured to fixed table 1.

It has been found that, with apparatus as herein described, coatings can consistently be applied to articles in a production run with an accuracy of approximately ±0.0002 of an inch.

We claim:

1. Apparatus for precision coating an article with a slurry, said apparatus comprising:

(a) a silk screen (15) having the configuration of the coating to be applied to the article formed therein, (b) a universal compound table (34) below the silk screen (15), (c) a fixture (39) mounted to the universal compound table (34) and adapted to support the article (40) to be coated with the slurry.

(d) said universal compound table (34) being adapted to precisely orient and position the article (40) with the configuration of the coating to be applied thereto formed in the silk screen (15), (e) guide means (4, 7) mounting said silk screen (15) for movement in a vertical direction only toward engagement with the article (40) to be coated or selectively away therefrom, (f) squeegee means (27) to force the slurry through the silk screen (15) on to the surface of the article (40), (g) said fixture (39) comprising:

a plate (49) adapted to support said article (40) on the central portion thereof, a pair of locating elements (54) slidably mounted to opposite ends of said plate (49), said locating elements (54) being movable toward the central portion of said plate (49) to engage and hold said article (40) or selectively movable away from the central portion of said plate (49) towards the opposite ends thereof, cam means (58) to simultaneously move said locating elements (54) toward the central portion of said plate (49) or selectively away from the central portion of said plate (49) towards the opposite ends thereof, a plurality of apertures (48, 50) extending through said plate (49) within the periphery of the article (40) mounted thereon, a chamber (63) below said plate (49) communicating with said apertures (48, 50), vacuum means (64) to apply a vacuum to said chamber (63).

2. Apparatus for precision coating an article with a slurry, said apparatus comprising:

(a) a fixedly supported stationary first table (1), (b) a universal compound table (34) mounted on and secured to said first table (1), said universal compound table (34) comprising a horizontal platen (37) adapted to be adjustably translated in a horizontal plane and which is further adapted to be rotated about a vertical axis, said horizontal platen (37) being adapted to support the article (40) to be coated with the slurry, (c) guide means (4) secured to said first table (1) and extending upwardly therefrom, (d) a second table (5) slidably mounted to said guide means (4) above said first table (1), said second table (5) being capable of movement in a vertical direction only, said second table (5) having a vertical opening (13) therethrough overlying said horizontal platen (37), (e) a silk screen (15) having formed therein the configuration of the coating to be applied to the article (40), said silk screen (15) being mounted to said second table (5) adjacent said vertical opening (13) in said second table (5), said silk screen (15) overlying said horizontal platen (37), (f) said universal compound table (34) being adapted to precisely orient and position the article (40) with respect to the configuration of the coating to be applied thereto formed in the silk screen (15), (g) power means (8) operatively interposed between said first table (1) and said second table (5) to lower said second table (5) thereby to engage said silk screen (15) with the article (40) to be coated or selectively to raise said second table (5), said power means (8) comprising:

(i) a fluid cylinder (8) mounted to the underside of said first table (1), (ii) a piston rod (9) operated by said fluid cylinder (8) and having its upper end secured to said second table, (iii) fluid lines (10 and 11) communicating with the opposite ends of said fluid cylinder (8) and adapted to selectively pressurize either end of said fluid cylinder (8), (h) limit stop means (65) mounted to the upper surface of said first table (1) and extending upwardly therefrom, said limit stop means (65) being adapted to engage the underside of said second table (5) and limit downward movement thereof below a predetermined point, (i) a pair of parallel guide rods (17) mounted along opposite sides of said vertical opening (13), (j) a travelling member (19), said travelling member (19) having an aperture at each end thereof, each aperture slidably receiving one of said guide rods (17), (k) a vertical fluid cylinder (26) mounted to the midpoint of said travelling member (19), (l) a squeegee (27) operatively connected to said vertical fluid cylinder (26) and adapted to force the slurry through the silk screen (15) on to the surface of the article (40), (m) fluid lines (29 and 30) communicating with the opposite ends of said vertical fluid cylinder (26) and adapted to selectively pressurize either end of said vertical fluid cylinder (26) thereby to lower said squeegee (27) to operative engagement with said silk screen (15) or selectively to raise said squeegee (27) from operative engagement with said silk screen (15), (n) a horizontal fluid cylinder (20) mounted to said second table (5), said horizontal fluid cylinder (20) being operatively connected to the midpoint of said travelling member (19), (o) fluid lines (23 and 24) communicating with the opposite ends of said horizontal fluid cylinder (20) and adapted to selectively pressurize either end of said horizontal fluid cylinder (20) thereby to advance said travelling member (19) across said silk screen (15) or selectively to retract said travelling member (19) across said silk screen (15).

3. Apparatus as in claim 2, wherein:

(p) said second table (5) has a first end and an opposite second end and is slidably mounted intermediate said first and second ends to said guide means (4), and (q) said silk screen (15) is mounted to said second table (5) adjacent said first end thereof, said apparatus further comprising:

(r) adjustable counterweight means (33) mounted to said second table (5) adjacent said second end thereof.

References Cited

UNITED STATES PATENTS

| | | | |
|---|---|---|---|
| 2,124,011 | 7/1938 | Smith | 101—123 |
| 2,779,275 | 1/1957 | Spainhour | 101—407 |
| 2,997,948 | 8/1961 | Scheeler et al. | 101—126 |
| 3,138,095 | 6/1964 | Wells | 101—123 |

FOREIGN PATENTS

| | | |
|---|---|---|
| 777,022 | 6/1957 | Great Britain. |

ROBERT E. PULFREY, Primary Examiner

C. D. CROWDER, Assistant Examiner

U.S. Cl. X.R.

101—123, 126, 407; 118—213; 248—363; 269—21, 233